United States Patent
Cricri (10) Patent No.: US 11,347,302 B2
(45) Date of Patent: May 31, 2022

(54) METHODS AND APPARATUSES RELATING TO THE HANDLING OF VISUAL VIRTUAL REALITY CONTENT

(71) Applicant: Nokia Technologies Oy, Espoo (FI)

(72) Inventor: Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 865 days.

(21) Appl. No.: 16/076,139

(22) PCT Filed: Feb. 2, 2017

(86) PCT No.: PCT/FI2017/050054
§ 371 (c)(1),
(2) Date: Aug. 7, 2018

(87) PCT Pub. No.: WO2017/137658
PCT Pub. Date: Aug. 17, 2017

(65) Prior Publication Data
US 2021/0191505 A1 Jun. 24, 2021

(30) Foreign Application Priority Data
Feb. 9, 2016 (EP) .................................. 16154749

(51) Int. Cl.
*G06F 3/01* (2006.01)
*G06F 3/14* (2006.01)
(52) U.S. Cl.
CPC .............. *G06F 3/011* (2013.01); *G06F 3/017* (2013.01); *G06F 3/14* (2013.01)
(58) Field of Classification Search
CPC ........ G06F 3/011; G06F 3/017; G02B 27/017
See application file for complete search history.

(56) References Cited

U.S. PATENT DOCUMENTS

2011/0316790 A1 12/2011 Ollila et al.
2012/0249741 A1* 10/2012 Maciocci .............. G06T 15/503
348/46

(Continued)

FOREIGN PATENT DOCUMENTS

EP 3131064 A1 2/2017
EP 3190503 A1 7/2017

(Continued)

OTHER PUBLICATIONS

Office Action received for corresponding European Patent Application No. 16154749.2, dated Feb. 19, 2019, 11 pages.

(Continued)

*Primary Examiner* — Kent W Chang
*Assistant Examiner* — Chayce R Bibbee
(74) *Attorney, Agent, or Firm* — Joseph C. Drish; Harrington & Smith (57) ABSTRACT

This specification describes a method comprising responding to a first gesture by a first user delimiting a visual virtual reality content portion from visual virtual reality content being consumed by the first user via a first head-mounted display by selecting the delimited visual virtual reality content portion, responding to a second gesture by the first user directed towards a content consumption device associated with a second user by identifying the content consumption device as a recipient of the selected visual virtual reality content portion, and causing the selected visual virtual (Continued)

reality content portion to be provided to the content consumption device for consumption by t second user.

23 Claims, 6 Drawing Sheets

(56) References Cited

U.S. PATENT DOCUMENTS

| | | | |
|---|---|---|---|
| 2013/0083173 A1* | 4/2013 | Geisner | G09G 3/003 |
| | | | 348/51 |
| 2013/0103814 A1 | 4/2013 | Carrasco et al. | |
| 2013/0141421 A1 | 6/2013 | Mount et al. | |
| 2013/0201214 A1 | 8/2013 | Piippo et al. | |
| 2014/0229858 A1 | 8/2014 | Bieker et al. | |
| 2014/0250193 A1* | 9/2014 | Goncalves | G06F 1/1698 |
| | | | 709/206 |
| 2015/0095419 A1 | 4/2015 | Anantharaman et al. | |
| 2015/0156803 A1 | 6/2015 | Ballard et al. | |
| 2015/0181632 A1 | 6/2015 | Ur et al. | |
| 2015/0193187 A1 | 7/2015 | Kimn et al. | |
| 2016/0093108 A1* | 3/2016 | Mao | A63F 13/825 |
| | | | 345/633 |
| 2016/0350973 A1* | 12/2016 | Shapira | G06F 3/017 |

FOREIGN PATENT DOCUMENTS

| | | |
|---|---|---|
| WO | 2014/085369 A1 | 6/2014 |
| WO | 2015/125066 A1 | 8/2015 |
| WO | 2015/192117 A1 | 12/2015 |

OTHER PUBLICATIONS

"360-Degree Videos Now on Google Cardboard and iOS", YoutTube Creator Blog, Retrieved on Aug. 3, 2018, Webpage available at: https://youtube-creators.googleblog.com/2015/05/360-degree-videos-now-on-google.html.

"Bluetooth Core Specification Version 4.2", BLUETOOTH Specification, Dec. 2, 2014, 2772 pages.

Extended European Search Report received for corresponding European Patent Application No. 16154749.2, dated Jun. 30, 2016, 7 pages.

Salzmann et al., "The Two-User Seating Buck: Enabling Face-to-Face Discussions of Novel Car Interface Concepts", IEEE Virtual Reality Conference, Mar. 8-12, 2008, pp. 75-82.

International Search Report and Written Opinion received for corresponding Patent Cooperation Treaty Application No. PCT/FI2017/050054, dated Mar. 24, 2017, 15 pages.

Office Action received for corresponding European Patent Application No. 16154749.2, dated Aug. 6, 2018, 9 pages.

\* cited by examiner

METHODS AND APPARATUSES RELATING TO THE HANDLING OF VISUAL VIRTUAL REALITY CONTENT

RELATED APPLICATION

This application was originally filed as Patent Cooperation Treaty Application No. PCT/FI2017/050054 filed Feb. 2, 2017 which claims priority benefit to EP Patent Application No. 16154749.2, filed Feb. 9, 2016.

FIELD

This specification relates to the handling of visual virtual reality content.

BACKGROUND

In the field of immersive multimedia, consumers of multimedia content may wish to interact with one another, particularly if said consumers are in close proximity to each other, for example in the same room. This desire for interaction brings new possibilities in relation to handling the consumption of immersive multimedia content in an efficient and user-friendly way.

SUMMARY

In a first aspect, this specification describes a method comprising responding to a first gesture by a first user delimiting a visual virtual reality content portion from visual virtual reality content being consumed by the first user via a first head-mounted display by selecting the delimited visual virtual reality content portion, responding to a second gesture by the first user directed towards a content consumption device associated with a second user by identifying the content consumption device as a recipient of the selected visual virtual reality content portion, and causing the selected visual virtual reality content portion to be provided to the content consumption device for consumption by the second user.

Causing the selected visual virtual reality content portion to be provided to the content consumption device may comprise: causing a notification to be sent to the content consumption device, the notification indicating that the content consumption device has been identified as a recipient of the selected visual virtual reality content portion, and responding to a signal indicative of a user input by the second user indicating acceptance of the selected visual virtual reality content portion by causing the selected visual virtual reality content portion to be provided to the content consumption device for consumption by the second user.

The user input by the second user indicating acceptance of the selected visual virtual reality content portion may comprise a gesture by the second user towards the first head-mounted display.

The method may further comprise responding to a gesture by the first user away from the content consumption device or a gesture by the second user away from the first head-mounted display by causing the visual virtual reality content portion to be removed from the content consumption device.

The method may further comprise responding to a third gesture by the first user adjusting the delimitation of the selected visual virtual reality content portion by causing the adjusted selected visual virtual reality content portion to be provided to the content consumption device.

The selected visual virtual reality content portion provided to the content consumption device may comprise current visual virtual reality content currently being consumed by the first user via the first head-mounted display.

The selected visual virtual reality content portion provided to the content consumption device may comprise previously-consumed visual virtual reality content which has previously been consumed by the first user via the first head-mounted display.

The method may further comprise rewinding content in the selected visual virtual reality content portion based on the second gesture thereby to enable the previously-consumed visual virtual reality content to be provided via the content consumption device.

The amount by which the content is rewound may be based on the speed of the second gesture.

A lower speed of the second gesture may cause more rewinding and a higher speed of the second gesture may cause less rewinding.

The method may further comprise responding to one or more of: the second gesture, the gesture by the second user towards the first head-mounted display, a gesture by the first user away from the content consumption device, a gesture by the second user away from the first head-mounted display, and the third gesture, by causing rotation of the visual virtual reality content provided to the user performing the gesture.

One or more of the gestures may comprise a touchless gesture.

The first gesture may comprise a two-handed gesture in which a position of each hand defines an edge of the visual virtual reality content portion.

The content consumption device may be a second head-mounted display.

In a second aspect, this specification describes apparatus configured to perform any method as described with reference to the first aspect.

In a third aspect, this specification describes computer-readable instructions which, when executed by computing apparatus, cause the computing apparatus to perform any method as described with reference to the first aspect.

In a fourth aspect, this specification describes apparatus comprising at least one processor and at least one memory including computer program code, which when executed by the at least one processor, causes the apparatus to respond to a first gesture by a first user delimiting a visual virtual reality content portion from visual virtual reality content being consumed by the first user via a first head-mounted display by selecting the delimited visual virtual reality content portion, respond to a second gesture by the first user directed towards a content consumption device associated with a second user by identifying the content consumption device as a recipient of the selected visual virtual reality content portion, and cause the selected visual virtual reality content portion to be provided to the content consumption device for consumption by the second user.

The computer program code, when executed by the at least one processor may cause the apparatus to cause the selected visual virtual reality content portion to be provided to the content consumption device by: causing a notification to be sent to the content consumption device, the notification indicating that the content consumption device has been identified as a recipient of the selected visual virtual reality content portion, and responding to a signal indicative of a user input by the second user indicating acceptance of the selected visual virtual reality content portion by causing the selected visual virtual reality content portion to be provided to the content consumption device for consumption by the second user.

The user input by the second user indicating acceptance of the selected visual virtual reality content portion may comprise a gesture by the second user towards the first head-mounted display.

The computer program code, when executed by the at least one processor may cause the apparatus to respond to a gesture by the first user away from the content consumption device or a gesture by the second user away from the first head-mounted display by causing the visual virtual reality content portion to be removed from the content consumption device.

The computer program code, when executed by the at least one processor may cause the apparatus to respond to a third gesture by the first user adjusting the delimitation of the selected visual virtual reality content portion by causing the adjusted selected visual virtual reality content portion to be provided to the content consumption device.

The selected visual virtual reality content portion provided to the content consumption device may comprise current visual virtual reality content currently being consumed by the first user via the first head-mounted display.

The selected visual virtual reality content portion provided to the content consumption device may comprise previously-consumed visual virtual reality content which has previously been consumed by the first user via the first head-mounted display.

The computer program code, when executed by the at least one processor may cause the apparatus to rewind content in the selected visual virtual reality content portion based on the second gesture thereby to enable the previously-consumed visual virtual reality content to be provided via the content consumption device.

The amount by which the content is rewound may be based on the speed of the second gesture.

A lower speed of the second gesture may cause more rewinding and a higher speed of the second gesture may cause less rewinding.

The computer program code, when executed by the at least one processor may cause the apparatus to respond to one or more of: the second gesture, the gesture by the second user towards the first head-mounted display, a gesture by the first user away from the content consumption device, a gesture by the second user away from the first head-mounted display, and the third gesture, by causing rotation of the visual virtual reality content provided to the user performing the gesture.

One or more of the gestures may comprise a touchless gesture.

The first gesture may comprise a two-handed gesture in which a position of each hand defines an edge of the visual virtual reality content portion.

The content consumption device may be a second head-mounted display.

In a fifth aspect, this specification describes a computer-readable medium having computer-readable code stored thereon, the computer-readable code, when executed by at least one processor, cause performance of at least: responding to a first gesture by a first user delimiting a visual virtual reality content portion from visual virtual reality content being consumed by the first user via a first head-mounted display by selecting the delimited visual virtual reality content portion, responding to a second gesture by the first user directed towards a content consumption device associated with a second user by identifying the content consumption device as a recipient of the selected visual virtual reality content portion, and causing the selected visual virtual reality content portion to be provided to the content consumption device for consumption by the second user. The computer-readable code stored on the medium of the fifth aspect may further cause performance of any of the operations described with reference to the method of the first aspect.

In a sixth aspect, this specification describes apparatus comprising means for responding to a first gesture by a first user delimiting a visual virtual reality content portion from visual virtual reality content being consumed by the first user via a first head-mounted display by selecting the delimited visual virtual reality content portion, means for responding to a second gesture by the first user directed towards a content consumption device associated with a second user by identifying the content consumption device as a recipient of the selected visual virtual reality content portion, and means for causing the selected visual virtual reality content portion to be provided to the content consumption device for consumption by the second user. The apparatus of the sixth aspect may further comprise means for causing performance of any of the operations described with reference to the method of the first aspect.

In a seventh aspect, this specification describes a method comprising receiving a visual virtual reality content portion delimited from visual virtual reality content being consumed by a first user via a head-mounted display, and displaying the visual virtual reality content portion to a second user via a content consumption device.

Receiving a visual virtual reality content portion delimited from visual virtual reality content being consumed by a first user via a first head-mounted display may comprise receiving a notification indicating that the content consumption device has been identified as a recipient of the visual virtual reality content portion, and responding to a signal indicative of a user input by the second user indicating acceptance of the visual virtual reality content portion by receiving the visual virtual reality content portion. The user input may comprise a gesture by the second user towards the head-mounted display.

The method may further comprise responding to a gesture by the first user away from the content consumption device or a gesture by the second user away from the first head-mounted display by removing the visual virtual reality content portion from the content consumption device.

The method may further comprise responding to a gesture by the first user adjusting the delimitation of the visual virtual reality content portion by receiving and displaying the adjusted visual virtual reality content portion.

In an eighth aspect, this specification describes apparatus configured to perform any method as described with reference to the seventh aspect.

In a ninth aspect, this specification describes computer-readable instructions which, when executed by computing apparatus, cause the computing apparatus to perform any method as described with reference to the seventh aspect.

In a tenth aspect, this specification describes apparatus comprising at least one processor and at least one memory including computer program code, which when executed by the at least one processor, causes the apparatus to perform any method as described with reference to the seventh aspect.

In an eleventh aspect, this specification describes a computer-readable medium having computer-readable code stored thereon, the computer readable code, when executed by at least one processor, cause performance of any method as described with reference to the seventh aspect.

In a twelfth aspect, this specification describes apparatus comprising means for performing any method as described with reference to the seventh aspect.

BRIEF DESCRIPTION OF THE DRAWINGS

For a more complete understanding of the methods, apparatuses and computer-readable instructions described herein, reference is now made to the following descriptions taken in connection with the accompanying drawings, in which.

DETAILED DESCRIPTION

In the description and drawings, like reference numerals may refer to like elements throughout.

Figure 1:
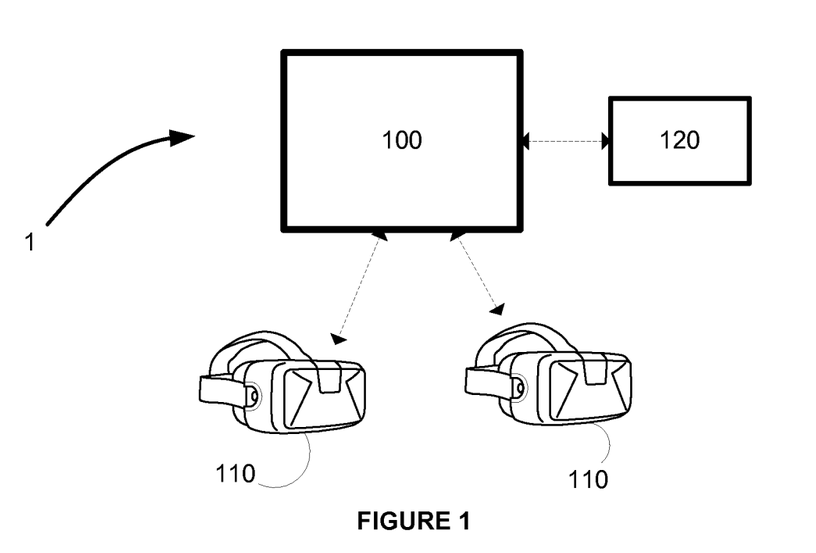
FIG. 1 is a block diagram illustrating a system enabling interactive content consumption including control apparatus, head-mounted displays and gesture detection apparatus.

FIG. 1 illustrates an example of a system 1 for enabling content to be consumed by multiple users. The system 1 comprises control apparatus 100 configured to control various operations of the system to enable the content to be consumed by the users. The control apparatus 100 may in general be any apparatus or device capable of performing the functions described below. For example, the control apparatus 100 may be a general purpose computer with the appropriate programs installed.

The system 1 further comprises a plurality of content consumption devices 110 associated with respective users for enabling the users to consume content provided to the content consumption devices 110. The content consumption devices 110 may be any type of display suitable for consuming multimedia content. For example, the content consumption devices 110 may comprise a head-mounted display (e.g. a near-eye display such as virtual reality glasses, a virtual reality headset, or a smartphone currently configured to output immersive VR content such as when used with a head-mounting arrangement such as a Gear VR headset). In some examples, the content provided to the content consumption devices 110 may be content stored in the control apparatus 100. In other examples, the content may be transmitted in (near) real-time to the control apparatus 100 from one or more content capture apparatuses (not shown) and then relayed to the content consumption devices 110.

The system 1 further comprises gesture detection apparatus 120 configured to detect gestures by users of the content consumption devices 110. The control apparatus 100 may be configured to respond to various gestures detected by the gesture detection apparatus 120 in various ways to enable interactive content consumption, as will be described in more detail below.

As illustrated by the arrows in FIG. 1, the control apparatus 100 is configured to be able to bi-directionally communicate with the content consumption devices 110 and gesture detection apparatus 120. Such communication may be wired communication or wireless communication. Wireless communication may be implemented for example with Bluetooth or other suitable wireless communication methods.

In some examples, the control apparatus 100 and gesture detection apparatus 120 may each be provided in separate physical units. In other examples, however, the control apparatus 100 and gesture detection apparatus 120 may be provided in a single physical unit. In yet other examples, the gesture detection apparatus 120 may be provided in each of the content consumption devices 110 such that each content consumption device includes gesture detection apparatus 120 for detecting gestures by the user of that content consumption device 110.

As mentioned above, the content consumption devices 110 may each comprise a head-mounted display. Hereinafter, this specification will describe various functions and operations with reference to the content consumption devices 110 being head-mounted displays. However, it will be appreciated that one or more of the head-mounted displays referred to below may be a content consumption device of any suitable type. For instance, one or more of the head-mounted displays referred to below may be any type of content consumption device suitable for the functions and operations described. Such suitable types of device may include, but are not limited to mobile phones and tablet computers. For instance, in some embodiments, a first content consumption device may be a head-mounted display while a second content consumption device may be a content consumption device of any type. In other embodiments, for instance as illustrated in the Figures, both content consumption devices may be head-mounted displays.

Figure 2:
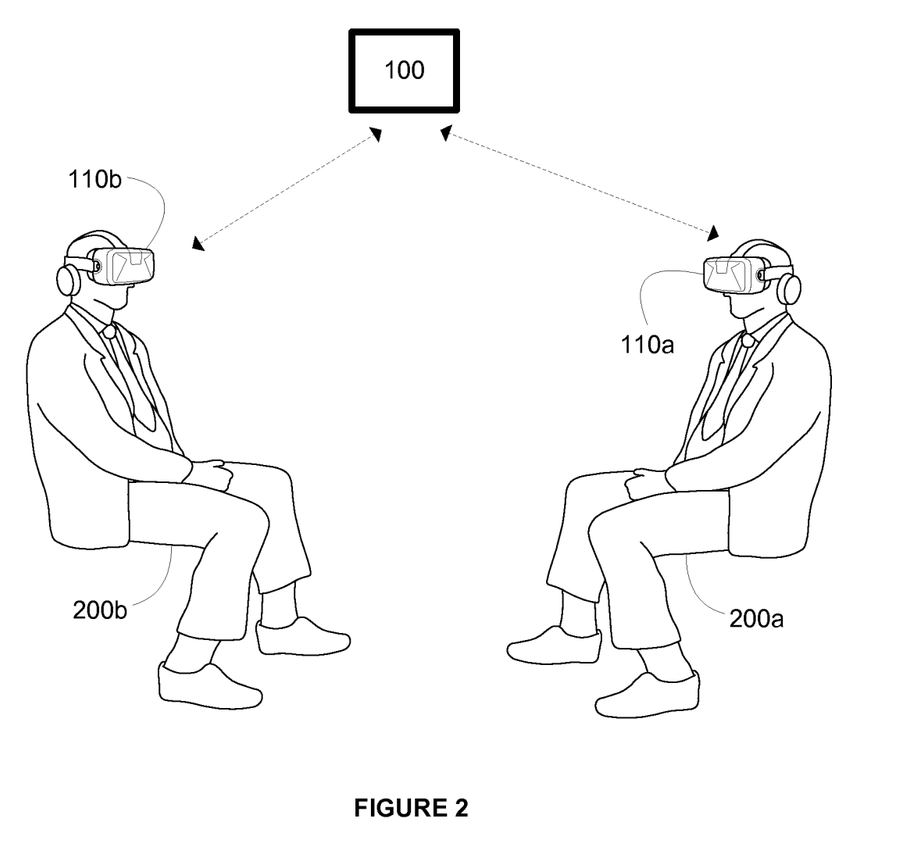
FIG. 2 illustrates an example of head-mounted displays worn by users which are in communication with the control apparatus.

Referring to FIGS. 1 and 2, the content provided to each of the head-mounted displays 110a, 110b may be visual virtual reality content. In the context of this specification, this may include, for example, a stream of visual data or a stream of audio-visual (AV) data. When consuming the visual virtual reality content via a head-mounted display 110a, 110b, a user 200a, 200b of the head-mounted display 110a, 110b may be provided with the experience of being immersed in a virtual environment. The content may therefore be referred to as "immersive content". In some examples, the virtual environment may correspond to a real world environment captured by one or more content capture apparatuses (e.g. video captured by one or more cameras, such as Nokia's OZO camera). In other examples, the virtual environment may be computer generated (e.g. a virtual environment in a computer game). In some examples, the visual virtual reality content may cover a wide range of angles surrounding the user in one or more planes. Content provided in a single plane may be referred to as "circular" or "partly-circular" content, whereas content provide in plural planes may be referred to as "spherical" or "partly-spherical" content. In some examples, the visual virtual reality content may cover a three hundred and sixty degree view of a virtual environment. Such content is commonly referred to as three hundred and sixty degree content or spherical content.

Traditionally, in non-virtual reality scenarios, when multiple users consume content at the same time, the users may be able to interact with each other while consuming the content. For example, when a group of friends watch video content together on a television, they are able to interact with each other while watching the video content. However, when a user consumes visual virtual reality content via a head-mounted display, interaction between the user using a head-mounted display and another user may be different due to the visual (and possibly audio) isolation of the user using a head-mounted display. For example, the user using a head-mounted display in this scenario may not be able to see or hear another user due to their wearing of a head-mounted display (which may include headphones).

One way to address the above use case is to detect gestures made by a user 200a of a head-mounted display 110a and controlling the operation of the head-mounted display 110a in response to the detected gestures. In this way, a user 200a of a head-mounted display 110a may interact with another user 200b by making gestures. In particular, a user 200a of a head-mounted display 110a may wish to interact with another user 200b by sharing the visual virtual reality content they are consuming with the other user 200b. As such, a user 200b may be able to access a wider range of visual virtual reality content, since a user 200a of a head-mounted display 110a is able to share their visual virtual reality content.

Gesture detection and/or gesture recognition may be achieved in various ways. In some examples, a user 200a, 200b may wear motion-sensing devices around the wrists or hands. In some examples, using visual-based gesture detection, a user 200a, 200b may be continuously monitored by a visual camera, and gestures are detected by visual analysis (for example by using machine learning techniques). In some examples, using depth-based gesture detection, a user 20a, 200b may be continuously monitored by depth-sensing devices, and gestures are detected by the analysis of depth data. It will be appreciated that a combination of any or all of the above approaches may be used, which may achieve higher robustness and accuracy of gesture detection compared to using a single approach.

As illustrated by an example embodiment in FIG. 2, the control apparatus 100 may be configured to cause visual virtual reality content to be provided to the first and second head-mounted displays 110a, 110b worn respectively by first and second users 200a, 200b. As illustrated by FIG. 2, the head-mounted displays may be a virtual reality headset. However, the head-mounted displays 110a, 110b are not limited as such and may be any type of head-mounted display configured to provide immersive visual virtual reality content to a user. The visual virtual reality content provided to the first head-mounted display 110a may be the same as the visual virtual reality content provided to the second head-mounted display 110b. In this instance, the visual virtual reality content provided to the first head-mounted display 110a and the visual virtual reality content provided to the second head-mounted display 110b may be the same content but with different timing (e.g., temporally shifted, played-back using different playback speeds, etc.). Alternatively, the first and second head-mounted displays 110a, 110b may be provided with different visual virtual reality content. For example, if the visual virtual reality content is a video recording, the first and second head-mounted displays may be provided with the same or different video recordings.

Figure 3A:
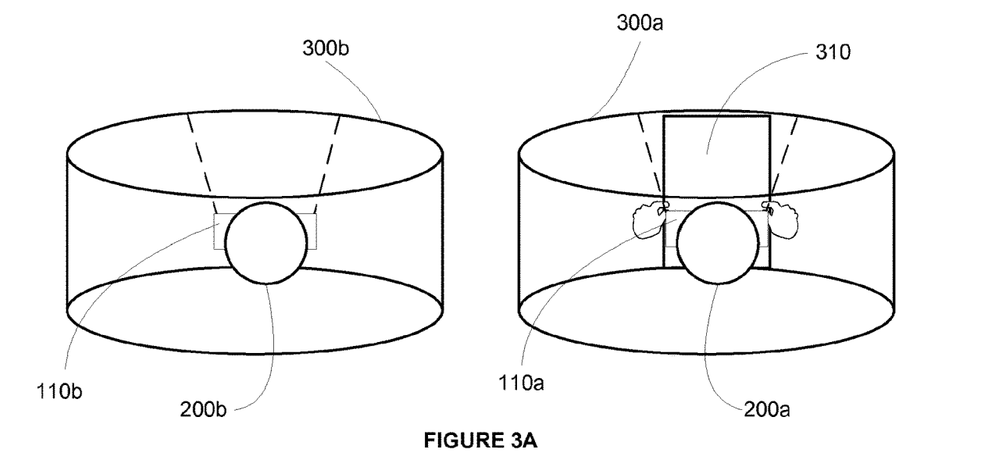
FIGS. 3A to 3C illustrate examples of various operations which occur in response to user gestures.

Referring to an example embodiment in FIG. 3A, the control apparatus 100 may be configured to respond to a signal indicative of provision of a first gesture by a first user 200a, the first gesture delimiting a visual virtual reality content portion 310 from visual virtual reality content 300a being consumed by the first user 200a via a first head-mounted display 110a, by selecting the delimited visual virtual reality content portion 310.

As illustrated by FIG. 3A, the delimitation of a visual virtual reality content portion 310 in this context means the delimitation of a spatial portion of the field of view (the field of view is indicated by dashed lines in FIGS. 3A-3C) of the first user 200a within the virtual environment of the visual virtual reality content 300a being consumed via the first head-mounted display 110a. The first gesture may comprise a two-handed gesture in which a position of each hand defines an edge of the visual virtual reality content portion 310 which is delimited. In some examples, the first gesture may comprise the first user 200a raising their hands and performing a grabbing motion with both hands. In this case, the portion of visual virtual reality content 310 delimited by the first gesture may depend on the relative positioning of the hands during the grabbing motion. For example, the positions of the first user's hands during the grabbing motion may delimit the vertical sides of a portion of visual virtual reality content 310. The gesture detection apparatus 120 may detect the first gesture and send signals to the control apparatus 100 to indicate to the control apparatus 100 that the first gesture has been detected. Based on these signals from the gesture detection apparatus 120, the control apparatus 100 may then select the portion of visual virtual reality content 310 delimited by the first gesture.

Figure 3B:
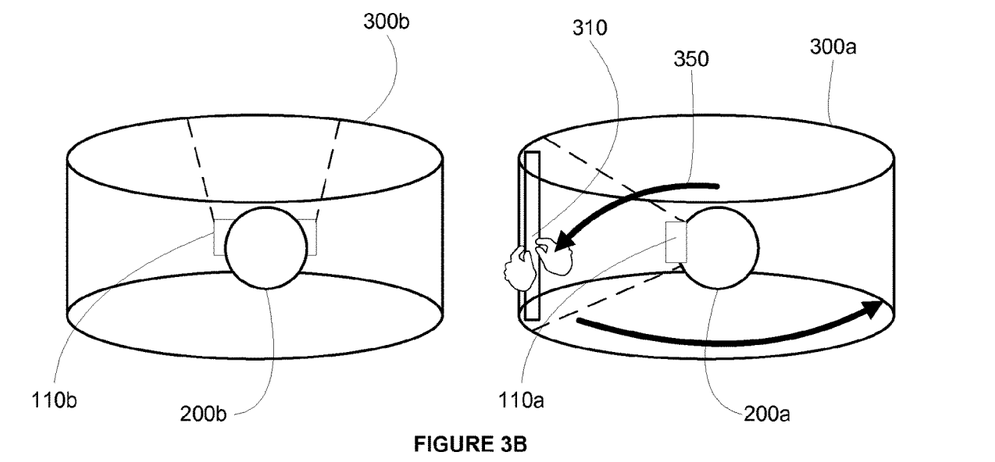

As illustrated by FIG. 3B, the control apparatus 100 may be further configured to respond to a signal indicative of provision of a second gesture by the first user 200a, the second gesture being directed towards a second head-mounted display 110b (as shown by arrow 350 in FIG. 3B), by identifying the second head-mounted display 100b as a recipient of the selected visual virtual reality content portion 310. The first user 200a may be provided with information indicating the direction to one or more users in the vicinity (such as the second user 200b). For example, the direction towards the second head-mounted display 110b may be indicated to the first user 200a by a visual indication overlaid on the visual virtual reality content 300a being consumed by the first user 200a. The visual indication may be overlaid on a portion of the visual virtual reality content 300a corresponding to the direction towards the second head-mounted display 110b. In other examples, no indication may be provided—the first user 200a may instead simply recall the location(s) of the other users. In other examples, when the first head-mounted display 110a is directed towards another user, an indication of this, for instance along with an identifier of the other user, may be provided via the first head-mounted display 110a.

The second gesture by the first user 200a towards the second head-mounted display 110b worn by the second user 200b may indicate that the second head-mounted display 110b is the intended recipient of the selected visual virtual reality content portion 310. The gesture detection apparatus 120 may detect the second gesture and send signals to the control apparatus 100 to indicate to the control apparatus 100 that the second gesture has been detected. Based on these signals from the gesture detection apparatus 120, the control apparatus 100 may then identify the second head-mounted display 110b as a recipient of the selected visual virtual reality content portion 310. For example, the control apparatus 100 may use data indicating the locations of the first and second head-mounted displays 110a, 110b (e.g. stored or received). In this instance, the control apparatus 100 may determine that the second head-mounted display 110b is to be identified as a recipient based on the positions of the first and second head-mounted displays 110a, 110b and the signals from the gesture detection apparatus 120 indicative of the direction of the gesture.

In some examples, the second gesture may comprise the first user 200a moving their hands towards the second head-mounted display 110b. In this case, as illustrated by FIG. 3B, the second gesture may cause the visual virtual reality content 300a being consumed by the first user 200a to be rotated. In other words, the virtual environment of the visual virtual reality content 300a being consumed by the first user 200a may be rotated about the first user 200a. Put another way, the whole immersive content provided to the first user 200a may be rotated about the first user 200a. This rotation may be such that the whole immersive content provided to the first user is rotated such that the selected, delimited content portion 310 faces towards the second head-mounted display 110b, as illustrated in FIG. 3B. The gesture detection apparatus 120 may detect the second gesture and indicate to the control apparatus 100 that the second gesture has been detected. The control apparatus 100 may then identify the second head-mounted display 110b as a recipient of the selected visual virtual reality content portion 310. In some examples, the first gesture may be maintained by the first user 200a while performing the second gesture. For instance, the first user 200a may maintain the "grabbing" position with their hands while also performing the rotation of second gesture.

The control apparatus 100 may be further configured to cause the selected visual virtual reality content portion 310 to be provided to the second head-mounted display 110b for consumption by a second user 200b. In some examples, the control apparatus 100 may achieve this by transmitting the selected visual virtual reality content portion 310 to the second head-mounted display 110b. Once provided to the second-head mounted display 110b, the selected visual virtual reality content portion 310 may be displayed to the second user 200b instead of a portion of visual virtual reality content that the second user 200b was originally viewing. The selected visual virtual reality content portion 310 may be displayed to the second user 200b from a direction corresponding to the position of first user 200a. For example, the selected visual virtual reality content portion 310 may be overlaid on top of the visual virtual reality content 300b that the second user 200b was originally viewing as a window. In some examples, the visual virtual reality content 300b that the second user 200b was originally viewing may be paused while the selected visual virtual reality content portion 310 is displayed to the second user 200b. Alternatively, the visual virtual reality content 300b that the second user 200b was originally viewing may not be paused.

As a result of the functionalities described above, a first user 200a is able to share content with a second user 200b while both the first and second users are wearing head-mounted displays 110a, 110b.

Causing the selected visual virtual reality content portion 310 to be provided to the second head-mounted display 110b may comprise causing a notification to be sent to the second head-mounted display 110b, the notification indicating that the second head-mounted display 110b has been identified as a recipient of the selected visual virtual reality content portion 310.

Causing the selected visual virtual reality content portion 310 to be provided to the second head-mounted display 110b may further comprise responding to a user input by the second user 200b indicating acceptance of the selected visual virtual reality content portion 310 by causing the selected visual virtual reality content portion 310 to be provided to the second head-mounted display 110b for consumption by the second user 200b. In other words, after the second head-mounted display 110b has been identified as a recipient of the selected visual virtual reality content portion 310, the selected visual virtual reality content portion 310 may not be immediately provided to the second head-mounted display 110b. Instead, a notification may first be sent to the second-head mounted display which alerts the second user 200b that the selected visual virtual reality content portion 310 may be provided to the second head-mounted display 110b. Then, the selected visual virtual reality content portion 310 may only be provided to the second head-mounted display 110b if the second user 200b accepts the selected visual virtual reality content portion 310 through a user input. In this way, the second user 200b may be given the choice of whether or not to consume the content that the first user 200a wishes to share. Alternatively, these operations may be omitted and the selected visual virtual reality content portion 310 may be provided to the second head-mounted display regardless of whether or not the second user 200b wishes to accept the selected visual virtual reality content portion 310.

In some examples, the user input by the second user 200b indicating acceptance of the selected visual virtual reality content portion 310 may comprise a gesture by the second user 200b towards the first head-mounted display 110a. In some examples, this gesture may comprise the second user 200b raising their hands, performing a grabbing motion and moving their hands towards the first head-mounted display 110a. In other words, this gesture may be similar to a combination of the first and second gestures described above with respect to the first user 200a, but may be directed towards the first head-mounted display 110a. In this case, the gesture by the second user 200b towards the first head-mounted display 110a may cause the visual virtual reality content being consumed by the second user 200b to be rotated. In other words, the virtual environment of the visual virtual reality content being consumed by the second user 200b may be rotated about the second user 200b. This rotation may be such that content in the field of view of the second user 200b is rotated to face towards the first head-mounted display 110a.

In some examples, the notification provided to the second user 200b via the second head-mounted display 110b, may indicate the direction towards and/or the location of the first head-mounted display 110a (e.g. via an arrow). Similarly, in some examples, in response to detection of the first gesture by the first user (i.e. that for delimiting the content portion), the control apparatus may cause an indicator to be displayed (e.g. an arrow) which indicates the direction towards and/or the location of the second head-mounted display 110b.

The control apparatus 100 may be further configured to respond to a signal indicative of a gesture by the first user away from the second head-mounted display or a gesture by the second user away from the first head-mounted display by causing the visual virtual reality content portion to be removed from the second head-mounted display. In other words, a gesture by either of the first and second users 200a, 200*b* which is directed away from the head-mounted display of the other user may cause the visual virtual reality content portion 310 to be removed from the second head-mounted display 110*b*.

In some examples, the gesture by either of the first and second users 200*a*, 200*b* away from the head-mounted display of the other user may comprise either of the first and second users 200*a*, 200*b* raising their hands, performing a grabbing motion and moving their hands away from the head-mounted display of the other user. In this case, the gesture by either of the first and second users 200*a*, 200*b* away from the head-mounted display of the other user may cause the visual virtual reality content being consumed by the user performing the gesture to be rotated. In other words, the entire three hundred and sixty degree view of the virtual environment of the visual virtual reality content being consumed by the user performing the gesture is rotated about the user performing the gesture. This rotation may be such that content in the field of view of the user performing the gesture is rotated to face away from the head-mounted display of the other user. In this way, the sharing of content may be terminated by either the first user 200*a* or the second user 200*b*. In some examples, the selected visual virtual reality content may only be removed from the second head-mounted display 110*b* if the gesture by first or second user rotates the content in their field of view a sufficient distance away from other user. For example, the selected visual virtual reality content may only be removed if the gesture by the first or second user rotates the content in their field of view beyond a threshold angle (e.g. back to its original orientation).

Figure 3C:
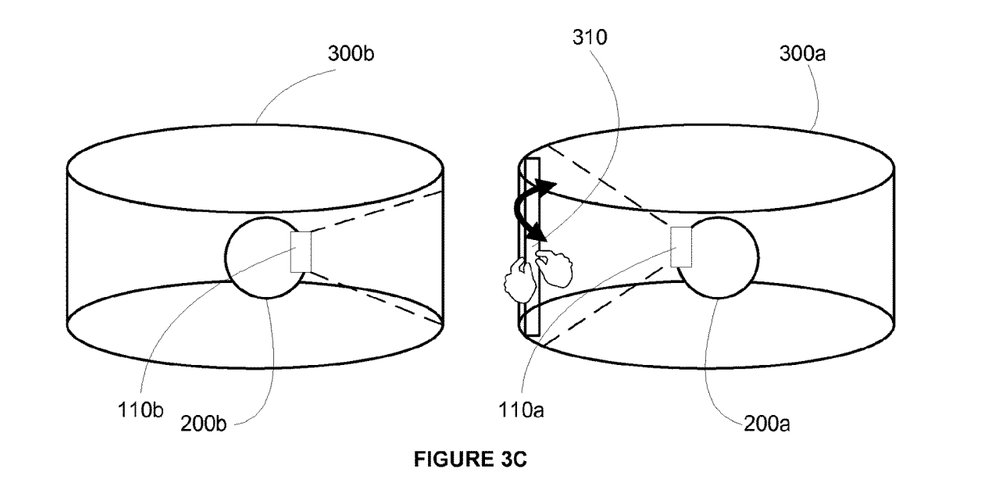

The control apparatus 100 may be further configured to respond to a signal indicative of third gesture by the first user 200*a* adjusting the delimitation of the selected visual virtual reality content portion 310 by causing the adjusted selected visual virtual reality content portion to be provided to the second head-mounted display 110*b*. In some examples, this gesture may comprise the first user 200*a* raising their hands, performing a grabbing motion and moving their hands left or right. As above, the third gesture may cause the visual virtual reality content being consumed by the first user 200*a* to be rotated, as illustrated by FIG. 3C. In other words, the entire three hundred and sixty degree view of the virtual environment of the visual virtual reality content being consumed by the first user 200*a* may be rotated about the first user 200*a*. In other words, while the selected visual virtual reality content 310 is being provided to the second head-mounted display 110*b*, the first user may perform a third gesture to adjust the content that falls within the delimitation of the selected visual virtual reality content portion 310. For example, if a region of interest moves out of the selected visual virtual reality content portion, the first user may perform the third gesture to keep the region of interest within the selected visual virtual reality content portion.

In some examples, the selected visual virtual reality content portion 310 provided to the second head-mounted display 110*b* may comprise current visual virtual reality content currently being consumed by the first user 200*a* via the first head-mounted display 110*a*.

In some examples, the selected visual virtual reality content portion 310 provided to the second head-mounted display 110*b* may comprise previously-consumed visual virtual reality content which has already been consumed by the first user 200*a* via the first head-mounted display 110*a*. For example, the previously-consumed visual virtual reality content may be a video portion which has been provided to the first head-mounted display 110*a* and has already consumed by the first user 200*a*.

In such examples, the control apparatus 100 may be further configured to rewind content in the selected visual virtual reality content portion 310 based on the second gesture to provide the past visual virtual reality content. For example, if the previously-consumed visual virtual reality content is a video portion which has already been provided to the first head-mounted display 110*a*, the control apparatus 100 may rewind the selected visual virtual reality content portion according to the second gesture such that the previously-consumed content can then be played back to the second user. In such examples, the amount of rewinding may be displayed to the first user 200*a*. For example, the amount of rewinding may be displayed as relative time compared to the current time of the visual virtual reality content which has not been rewound (e.g. −10 seconds, −20 seconds etc.).

In some examples, the amount by which the content is rewound may be based on the speed of the second gesture (e.g. a rate of rotation). In such examples, a lower speed may cause more rewinding to be performed and a higher speed may cause less rewinding to be performed. In other words, the slower the second gesture is performed, the more the previously consumed content will be rewound. In this way, the first user 200*a* may control how much rewinding occurs by the speed with which the second gesture is performed. In some examples, the rate of rewinding may be constant. In other examples, the rate of rewinding may depend on the speed of the second gesture (e.g. a higher speed of the second gesture may result in a lower rate of rewinding, and vice versa. Or it may be another way, i.e. higher speed of the second gesture may result in a higher rate of rewinding, and lower speed of the second gesture may result in a lower rate of rewinding).

In some examples, whether or not the content is rewound by the second gesture by the first user towards the second user occurs may depend on, for instance, whether or not the speed of the second gesture (e.g. rate of rotation) is above a threshold. For instance, if the rate of rotation is above a threshold, the content may not be re-wound, whereas if the rate of rotation is below the threshold, rewinding may be performed. In other examples, whether or not rewinding is performed may depend on one or more characteristic of one of the first and second gestures (e.g. the type of gesture performed). For instance, if the first user performs a "grabbing" gesture (e.g. with all digits) to delimit the portion of content, the control apparatus 100 may not rewind the content when the second gesture is performed, whereas, if the user performs a "pinching" gesture (e.g. with just a finger and thumb), the control apparatus may rewind the content.

As has been described above with reference to FIGS. 3B and 3C, in some examples, one or more of the second gesture, the gesture by the second user 200*b* towards the first head-mounted display 110*a*, the gesture by the first user 200*a* away from the second head-mounted display, the gesture by the second user 200*b* away from the first head-mounted display, and the third gesture may be a gesture causing rotation of the visual virtual reality content 300 provided to the user performing the gesture. In other words, the visual virtual reality content provided to the head-mounted display of the user performing the gesture may be rotated.

In some examples, one or more of the gestures described above may comprise a touchless gesture. For example, any one of or any combination of the gestures described above may be a gesture in the air by a user 200*a*, 200*b*. However, the gestures are not limited as such and may comprise a touch gesture, for example on a touch-sensitive device associated with each user which may provide the gesture detection functionality.

As described previously, in some examples, the visual virtual reality content 300 may comprise three hundred and sixty degree video content. In other words, the visual virtual reality content 300 described above may cover a three hundred and sixty degree field of view of a virtual environment. Alternatively, the visual virtual reality content 300 may cover less than a three hundred and sixty degree field of view of a virtual environment.

Although gestures have been described above with respect to specific examples, it will be appreciated that, in general, each of the gestures described above may be any type of gesture suitable for the causing the desired function (e.g. delimiting and sharing) to be achieved. For instance, in examples in which the second head-mounted display nob is another type of content consumption device instead (e.g. a mobile phone or tablet computer), the gesture by the second user 200b towards the first head-mounted display 110a indicating acceptance of the selected visual virtual reality content portion may comprise a gesture directing the relevant content consumption device towards the first head-mounted display 110a. Similarly, a gesture by the second user 200b away from the first head-mounted display 110a causing the visual virtual reality content portion to be removed may comprise a gesture directing the relevant content consumption device away from the first head-mounted display 110a.

Although the above examples have been described with respect to two users and two head-mounted displays, it will be appreciated that the concepts, operations and functionalities described above may be extended to scenarios in which there are more than two users and more than two head-mounted displays. For example, a user wearing a head-mounted display may share content with two or more other users wearing head-mounted displays, according to the above described operations.

Figure 4:
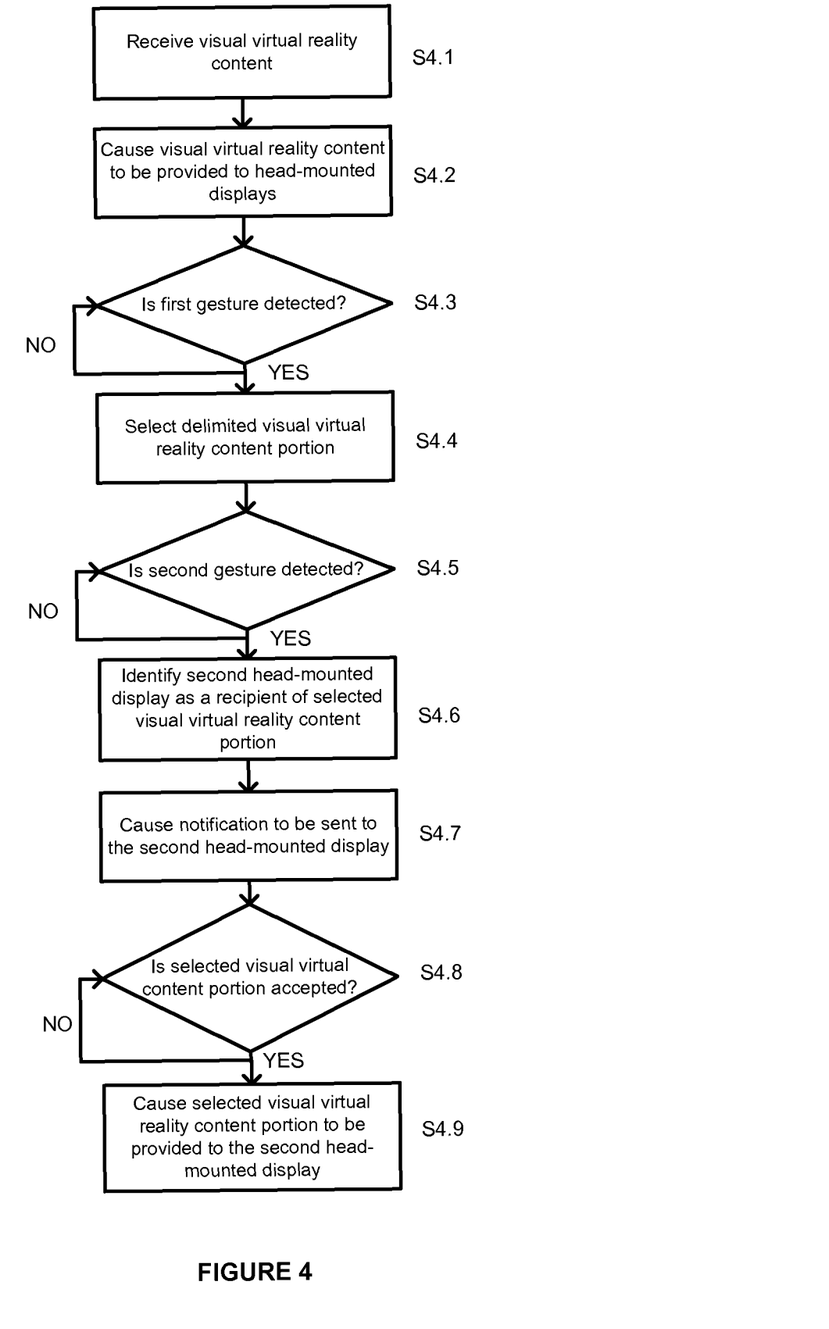
FIG. 4 is a flowchart illustrating examples of various operations which may be performed by the control apparatus.

FIG. 4 is a flowchart showing examples of various operations which may be performed by the control apparatus 100 of FIG. 1.

In operation S4.1, the control apparatus 100 may receive visual virtual reality content. In some examples, the visual virtual reality content may be received from one or more content capture apparatuses in the form of one or more live streams. In other examples, the visual virtual reality content may be received in the form of one or more files transferred from one or more content capture apparatuses. It will be appreciated that the above examples are not limiting and that, in general, the visual virtual reality content may be received by the control apparatus from any appropriate source. Alternatively, this step may be omitted altogether and the virtual reality content may instead be generated by the control apparatus 100.

In operation S4.2, the control apparatus 100 may cause visual virtual reality content to be provided to the head-mounted displays. In other words, each head-mounted display is provided with its own visual virtual reality content. As described above, the visual virtual reality content provided to each head-mounted display may be the same content or different content.

In operation S4.3, the control apparatus 100 may monitor whether or not a first gesture is detected. As described above, the first gesture is a gesture delimiting a visual virtual reality content portion 310 from visual virtual reality content 300 being consumed by a first user 200a via a first head-mounted display 110a. If the first gesture is detected (YES), then the control apparatus proceeds to operation S4.4. In operation S4.4, the control apparatus 100 selects the visual virtual reality content delimited by the first gesture. If the first gesture has not been detected (NO), the control apparatus returns to operation S4.3 and continues to monitor whether or not the first gesture is detected.

In operation S4.5, the control apparatus 100 may monitor whether or not a second gesture is detected. As described above, the second gesture is a gesture by the first user 200a towards a second head-mounted display 110b. If the second gesture is detected (YES), then the control apparatus 100 proceeds to operation S4.6. In operation S4.6, the control apparatus 100 identifies the second head-mounted display 110b (to which the gesture is towards) as a recipient of the selected visual virtual reality content 310. If the second gesture has not been detected (NO), the control apparatus 100 returns to operation S4.5 and continues to monitor whether or not the second gesture is detected.

In operation S4.7, the control apparatus 100 may cause a notification to be sent to the second head-mounted display 110b. As described above, the notification indicates that the second head-mounted display 110b has been identified as a recipient of the selected visual virtual reality content portion 310. The notification may also include an indication regarding a direction towards and/or location of the first user 200a.

In operation S4.8, the control apparatus 100 may monitor whether or not the selected visual virtual reality content portion is accepted by the user of the second head-mounted display 110b. If the selected visual virtual reality content portion is accepted (YES), then the control apparatus 100 proceeds to operation S4.9. In operation S4.9, the control apparatus 100 causes the selected visual virtual reality content portion 310 to be provided to the second head-mounted display 110b. If the selected visual virtual reality content portion has not been accepted (NO) (or, put another way, is declined), the control apparatus 100 returns to one of operations S4.3 and S4.8 and continues to monitor for the first gesture/whether or not the selected visual virtual reality content portion is accepted.

Figure 5:
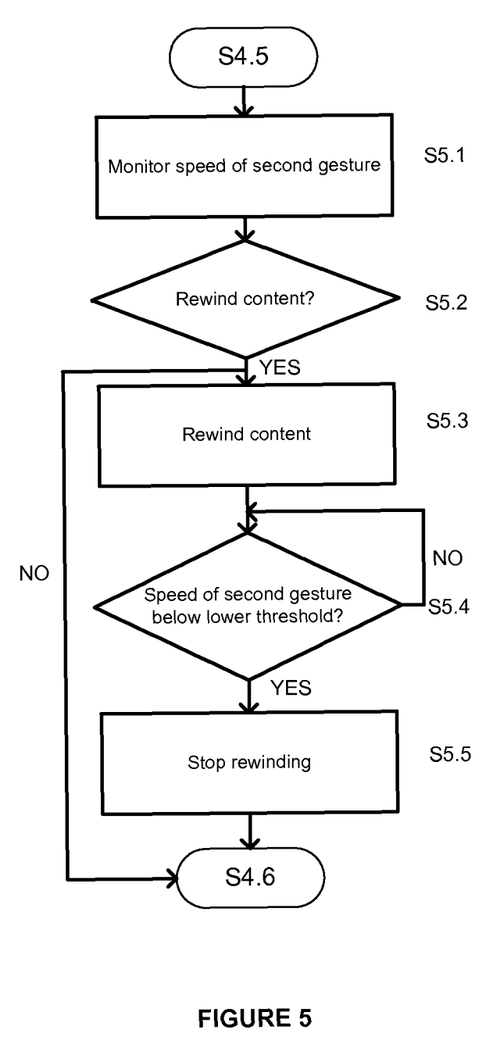
FIG. 5 is a flowchart illustrating examples of various operations which may be performed by the control apparatus.

FIG. 5 is a flowchart illustrating examples of various operations relating to the rewinding of content which may in some examples be performed by the control apparatus 100 in addition to various operations from the flow chart of FIG. 4.

At operation S5.1, the control apparatus 100 may monitor the speed of the second gesture (e.g. a rate of rotation of the second gesture). The control apparatus 100 may determine and monitor the speed of the second gesture based on signals received from the gesture detection apparatus 120.

At operation S5.2, the control apparatus 100 may determine whether or not to rewind content in the selected visual virtual reality content portion. As described above, whether or not the content is rewound by the second gesture may depend on one or more characteristics (for instance, the speed or type of gesture) of one of the first and second gestures. As such, operation S5.2 may include determining whether the rate of rotation of the second gesture is above or below a threshold. In other examples, operation S5.2 may include determining whether the type of the first or second gestures is of a particular type.

If the control apparatus 100 determines that content is not to be rewound (NO) (e.g. because the rate of rotation of the second gesture is above a threshold), then no rewinding is performed and the control apparatus 100 proceeds to operation S4.6. If the control apparatus determines that content is to be rewound (YES) (e.g. because the rate of rotation of the second gesture is below a threshold), it proceeds to operation S5.3.

At operation S5.3, the control apparatus rewinds content in the selected visual virtual reality content portion. As described above, the amount of rewinding may depend on the speed of the second gesture. A lower speed (e.g. lower rate of rotation) may cause more rewinding to be performed and a higher speed (e.g. higher rate of rotation) may cause less rewinding to be performed.

At operation S5.4, the control apparatus may monitor whether or not the speed of the second gesture (e.g. rate of rotation) is below a lower threshold to determine whether or not to continue rewinding. If the speed of the second gesture is not below a lower threshold (NO), the control apparatus may continue to rewind the content and continue to perform operations S5.3 and S5.4. If the speed of the second gesture is below a lower threshold (YES), the control apparatus may proceed to operation S5.5 and stop rewinding. For instance, the control apparatus may continue to rewind the content for as long as the rotation performed (e.g. the speed of the second gesture is above zero). In such examples, when the rotation stops, the control apparatus may respond by stopping the rewind operation.

Following operation S5.5, the control apparatus 100 proceeds to operation S4.6.

Figure 6:
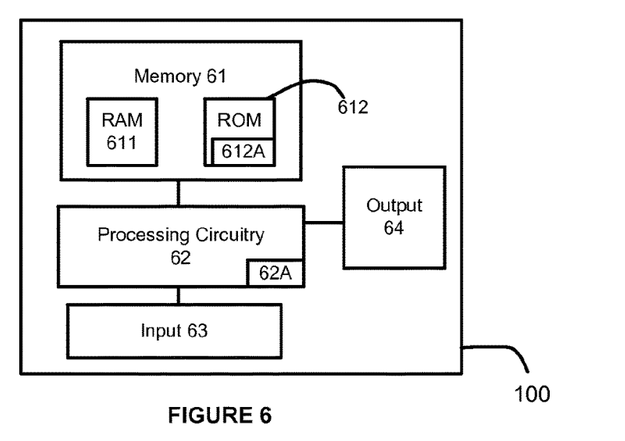
FIG. 6 is a schematic diagram of an example configuration of the control apparatus of FIG. 1.

FIG. 6 is a schematic block diagram of an example configuration of the control apparatus 100 such as described above with reference to FIGS. 1 to 5. The control apparatus 100 may comprise memory 61, processing circuitry 62, an input 63, and an output 64. The memory 61 may comprise read-only memory 612 (ROM) and random access memory 611 (RAM). The processing circuitry 62 may be configured to process data to carry out the operations of the control apparatus 100 described above. The input 63 may be configured to receive signals, for example signals from the gesture detection apparatus 120. The signals from the gesture detection apparatus 120 may be at least one of the following signal types: a signal indicating whether or not a gesture has been detected, a camera signal, a gyro sensor signal, an accelerometer signal, a magnetometer signal, an optical sensor signal, a sound signal and a motion sensor signal. The output 64 may be configured to provide signals to the first and second head-mounted displays 110a, 110b. For example the output 64 may be configured to provide signals containing visual virtual reality content to one or both of the head-mounted displays 110a, 110b.

Figure 7:
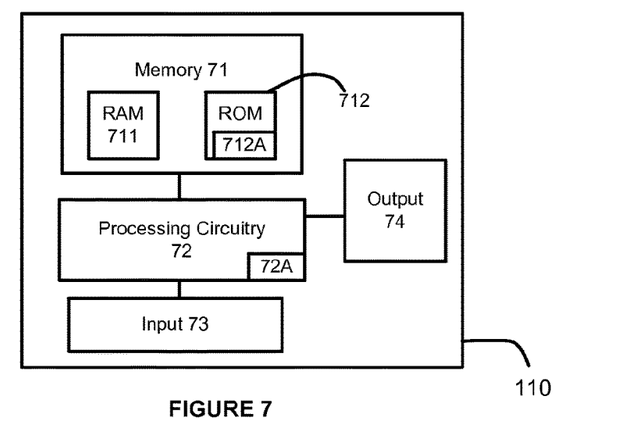
FIG. 7 is a schematic diagram of an example configuration of one of the head-mounted displays of FIG. 1.

FIG. 7 is a schematic block diagram of an example configuration of a head-mounted display 110a, 110b such as described above with reference to FIGS. 1 to 5. The head-mounted display 110a, 110b may comprise memory 71, processing circuitry 72, an input 73 and an output 74. The memory 71 may comprise read-only memory 712 (ROM) and random access memory 711 (RAM). The input 73 may be configured to receive signals, for example signals containing visual virtual reality content from the control apparatus 100. The input 73 may be further configured to receive at least one of the following signal types: a camera signal, a gyro sensor signal, an accelerometer signal, a magnetometer signal, an optical sensor signal, a sound signal and a motion sensor signal. The processing circuitry 72 may be configured to process the signals containing visual virtual reality content and provide the visual virtual reality content to the output 74 for consumption by a user of the head-mounted display. The output 74 may comprise display apparatus (e.g. one or more display screens) configured to display visual content to the eyes of a user. The output 74 may comprise audio output apparatus (e.g. headphones) configured to provide audio content to the ears of a user.

Figure 8:
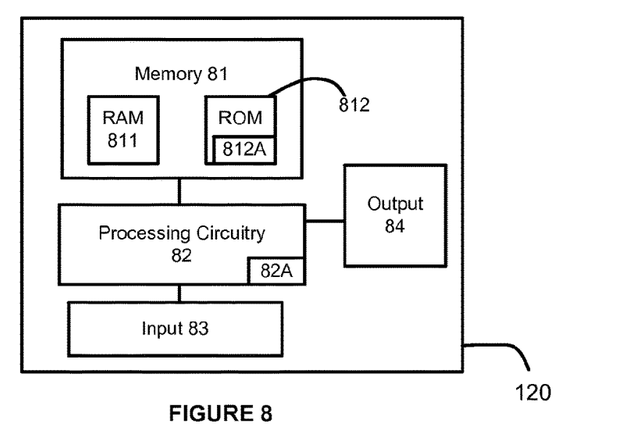
FIG. 8 is a schematic diagram of an example configuration of the gesture detection apparatus of FIG. 1.

FIG. 8 is a schematic block diagram of an example configuration of gesture detection apparatus 120 such as described with reference to FIGS. 1 to 5. The gesture detection apparatus 120 may comprise memory 81, processing circuitry 82, an input 83 and an output 84. The memory 71 may comprise read-only memory 812 (ROM) and random access memory 811 (RAM). The input 83 may comprise one or more sensors configured to receive various signals for gesture detection. For example, the one or more sensors may comprise one or more movement sensors (e.g. a gyro sensor, accelerometer, magnetometer, motion sensor etc.), and/or one or more optical sensors, and/or one or more cameras for detecting the movement of various body parts of a user. The processing circuitry 82 may be configured to process the signals received by the input to determine that a gesture has been detected. The output 84 may be configured to send signals indicating whether or not a gesture has been detected to the control apparatus 100. In other examples, the raw data provided by sensors may be provided to the control apparatus 100 and the control apparatus may perform the gesture recognition functionality.

The memory 61, 71, 81 described with reference to FIGS. 6, 7 and 8 may have computer readable instructions 612A, 712A, 812A stored thereon, which when executed by the processing circuitry 62, 72, 82 causes the processing circuitry 62, 72, 82 to cause performance of various ones of the operations described above. The processing circuitry 62, 72, 82 described above with reference to FIGS. 6, 7 and 8 may be of any suitable composition and may include one or more processors 62A, 72A, 82A of any suitable type or suitable combination of types. For example, the processing circuitry 62, 72, 82 may be a programmable processor that interprets computer program instructions and processes data. The processing circuitry 62, 72, 82 may include plural programmable processors. Alternatively, the processing circuitry 62, 72, 82 may be, for example, programmable hardware with embedded firmware. The processing circuitry 62, 72, 82 may be termed processing means. The processing circuitry 62, 72, 82 may alternatively or additionally include one or more Application Specific Integrated Circuits (ASICs). In some instances, processing circuitry 62, 72, 82 may be referred to as computing apparatus.

The processing circuitry 62, 72, 82 described with reference to FIGS. 6, 7 and 8 is coupled to the respective memory 61, 71, 81 (or one or more storage devices) and is operable to read/write data to/from the memory 61, 71, 81. The memory 61, 71, 81 may comprise a single memory unit or a plurality of memory units 611, 612, 711, 712, 811, 812 upon which the computer readable instructions 612A, 712A, 812A (or code) is stored. For example, the memory 61, 71, 81 may comprise both volatile memory 611, 711, 811 and non-volatile memory 612, 712, 812. For example, the computer readable instructions 612A, 712A, 812A may be stored in the non-volatile memory 612, 712, 812 and may be executed by the processing circuitry 62, 72, 82 using the volatile memory 611, 711, 811 for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories 61, 71, 81 in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 612A, 712A, 812A described herein with reference to FIGS. 6, 7 and 8 may be pre-programmed into the control apparatus 100, the head-mounted display 110a, nob and the gesture detection apparatus 120. Alternatively, the computer readable instructions 612A, 712A, 812A may arrive at the control apparatus 100, the head-mounted display 110a, nob and the gesture detection apparatus 120 via an electromagnetic carrier signal or may be copied from a physical entity such as a computer program product, a memory device or a record medium such as a CD-ROM or DVD. The computer readable instructions 612A, 712A, 812A may provide the logic and routines that enable the control apparatus 100, the head-mounted display 110a, nob and the gesture detection apparatus 120 to perform the functionalities described above. The combination of computer-readable instructions stored on memory (of any of the types described above) may be referred to as a computer program product.

Figure 9:
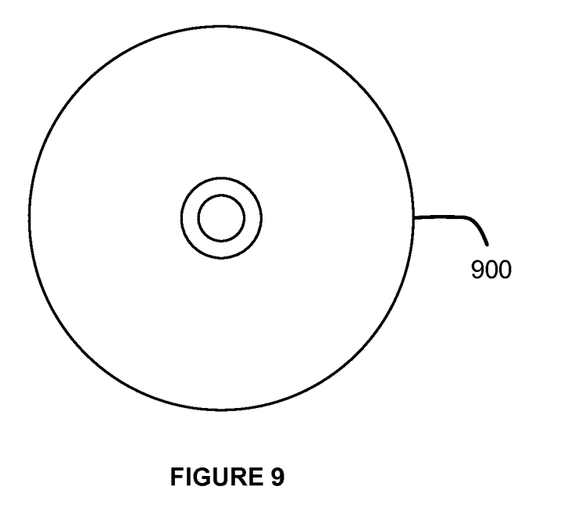
FIG. 9 illustrates an example of a computer-readable medium with computer-readable instructions stored thereon.

FIG. 9 illustrates an example of a computer-readable medium 900 with computer-readable instructions (code) stored thereon. The computer-readable instructions (code), when executed by a processor, may cause any one of or any combination of the operations described above to be performed.

Where applicable, wireless communication capability of the apparatuses/devices 100, 110, 120 may be provided by a single integrated circuit. It may alternatively be provided by a set of integrated circuits (i.e. a chipset). The wireless communication capability may alternatively be provided by a hardwired, application-specific integrated circuit (ASIC). Communication between the apparatuses/devices may be provided using any suitable protocol, including but not limited to a Bluetooth protocol (for instance, in accordance or backwards compatible with Bluetooth Core Specification Version 4.2) or a IEEE 802.11 protocol such as WiFi.

As will be appreciated, the control apparatus 100, the head-mounted display 110a, nob and the gesture detection apparatus 120 described herein may include various hardware components which have may not been shown in the Figures since they may not have direct interaction with embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4 and 5 are examples only and that various operations depicted therein may be omitted, reordered and/or combined.

Furthermore, although the above functionality is described as being performed by the control apparatus 100, in some examples it may be performed by one or both of the head-mounted displays 110a, 110b. For instance, in some examples, the control apparatus 100 may be incorporated in one or both of the head-mounted displays 110a, 110b.

Although various aspects of the invention are set out in the independent claims, other aspects of the invention comprise other combinations of features from the described embodiments and/or the dependent claims with the features of the independent claims, and not solely the combinations explicitly set out in the claims.

As used herein, virtual reality (VR) content may cover, but is not limited to, computer-generated VR content, content captured by a presence capture device such as Nokia's OZO camera or the Ricoh's Theta, and a combination of computer-generated and presence-device captured content. Indeed, VR content may cover any type or combination of types of immersive media (or multimedia) content.

It is also noted herein that while the above describes various examples, these descriptions should not be viewed in a limiting sense. Rather, there are several variations and modifications which may be made without departing from the scope of the present invention as defined in the appended claims.

The invention claimed is:
1. A method comprising:
responding, by an apparatus, to a first gesture by a first user delimiting a visual virtual reality content portion from visual virtual reality content being consumed by the first user via a first head-mounted display by selecting the delimited visual virtual reality content portion;

responding, by the apparatus, to a second gesture by the first user directed towards a content consumption device associated with a second user by identifying the content consumption device as a recipient of the selected visual virtual reality content portion;

causing, by the apparatus, the selected visual virtual reality content portion to be provided to the content consumption device for consumption by the second user; and rewinding, by the apparatus, content in the selected visual virtual reality content portion based on the second gesture thereby to enable previously-consumed visual virtual reality content to be provided via the content consumption device.

2. The method of claim 1, wherein causing the selected visual virtual reality content portion to be provided to the content consumption device comprises:

causing, by the apparatus, a notification to be sent to the content consumption device, the notification indicating that the content consumption device has been identified as a recipient of the selected visual virtual reality content portion; and responding, by the apparatus, to a signal indicative of a user input by the second user indicating acceptance of the selected visual virtual reality content portion by causing the selected visual virtual reality content portion to be provided to the content consumption device for consumption by the second user.

3. The method of claim 1, further comprising:

responding, by the apparatus, to a third gesture by the first user adjusting the delimitation of the selected visual virtual reality content portion by causing the adjusted selected visual virtual reality content portion to be provided to the content consumption device.

4. The method of claim 1, wherein the selected visual virtual reality content portion provided to the content consumption device comprises current visual virtual reality content currently being consumed by the first user via the first head-mounted display.

5. The method of claim 1, wherein the selected visual virtual reality content portion provided to the content consumption device comprises the previously-consumed visual virtual reality content which has been consumed by the first user via the first head-mounted display previously to selecting the selected visual virtual reality content portion.

6. The method of claim 1, wherein the amount by which the content is rewound is based on the speed of the second gesture.

7. The method of claim 6, wherein a lower speed of the second gesture causes more rewinding and a higher speed of the second gesture causes less rewinding.

8. The method of claim 1, comprising responding, by the apparatus, to one or more of:
the second gesture,
a gesture by the second user towards the first head-mounted display,
a gesture by the first user away from the content consumption device,
a gesture by the second user away from the first head-mounted display, and
a third gesture;
by causing rotation of the visual virtual reality content provided to the user performing the gesture.

9. The method of claim 1, wherein one or more of the gestures comprise a touchless gesture.

10. The method of claim 1, wherein the first gesture comprises a two-handed gesture in which a position of each hand defines an edge of the visual virtual reality content portion.

11. An apparatus comprising at least one processor and at least one non-transitory memory including computer program code, which when executed by the at least one processor, causes the apparatus to:

respond to a first gesture by a first user delimiting a visual virtual reality content portion from visual virtual reality content being consumed by the first user via a first head-mounted display by selecting the delimited visual virtual reality content portion, respond to a second gesture by the first user directed towards a content consumption device associated with a second user by identifying the content consumption device as a recipient of the selected visual virtual reality content portion, cause the selected visual virtual reality content portion to be provided to the content consumption device for consumption by the second user, and rewind content in the selected visual virtual reality content portion based on the second gesture thereby to enable previously-consumed visual virtual reality content to be provided via the content consumption device.

12. The apparatus of claim 11, further configured to:

cause a notification to be sent to the content consumption device, the notification indicating that the content consumption device has been identified as a recipient of the selected visual virtual reality content portion, and respond to a signal indicative of a user input by the second user indicating acceptance of the selected visual virtual reality content portion by causing the selected visual virtual reality content portion to be provided to the content consumption device for consumption by the second user.

13. The apparatus of claim 11, further configured to:

respond to a gesture by the first user away from the content consumption device or a gesture by the second user away from the first head-mounted display by causing the visual virtual reality content portion to be removed from the content consumption device.

14. The apparatus of claim 11, further configured to:

respond to a third gesture by the first user adjusting the delimitation of the selected visual virtual reality content portion by causing the adjusted selected visual virtual reality content portion to be provided to the content consumption device.

15. The apparatus of claim 11, further configured to provide current visual virtual reality content currently being consumed by the first user via the first head-mounted display.

16. The apparatus of claim 11, further configured to provide the previously-consumed visual virtual reality content which has been consumed by the first user via the first head-mounted display previously to selecting the selected visual virtual reality content portion.

17. The apparatus of claim 11, wherein the amount by which the content is rewound is based on the speed of the second gesture.

18. The apparatus of claim 17, wherein a lower speed of the second gesture causes more rewinding and a higher speed of the second gesture causes less rewinding.

19. The apparatus of claim 11,
configured to respond to one or more of:
the second gesture,
a gesture by the second user towards the first head-mounted display,
a gesture by the first user away from the content consumption device,
a gesture by the second user away from the first head-mounted display, and
a third gesture;
by causing rotation of the visual virtual reality content provided to the user performing the gesture.

20. The apparatus of claim 11, wherein one or more of the gestures comprise a touchless gesture.

21. The apparatus of claim 11, wherein the first gesture comprises a two-handed gesture in which a position of each hand defines an edge of the visual virtual reality content portion.

22. The apparatus of claim 11, wherein the content consumption device is a second head-mounted display.

23. A non-transitory computer readable medium comprising program instructions for causing an apparatus to at least:
respond to a first gesture by a first user delimiting a visual virtual reality content portion from visual virtual reality content being consumed by the first user via a first head-mounted display by selecting the delimited visual virtual reality content portion;
respond to a second gesture by the first user directed towards a content consumption device associated with a second user by identifying the content consumption device as a recipient of the selected visual virtual reality content portion;
cause the selected visual virtual reality content portion to be provided to the content consumption device for consumption by the second user; and
rewind content in the selected visual virtual reality content portion based on the second gesture thereby to enable previously-consumed visual virtual reality content to be provided via the content consumption device.

\* \* \* \* \*